March 1, 1932. J. J. HAGEMEISTER ET AL 1,847,510
INTERNAL COMBUSTION ENGINE LOCOMOTIVE
Filed Feb. 16, 1928
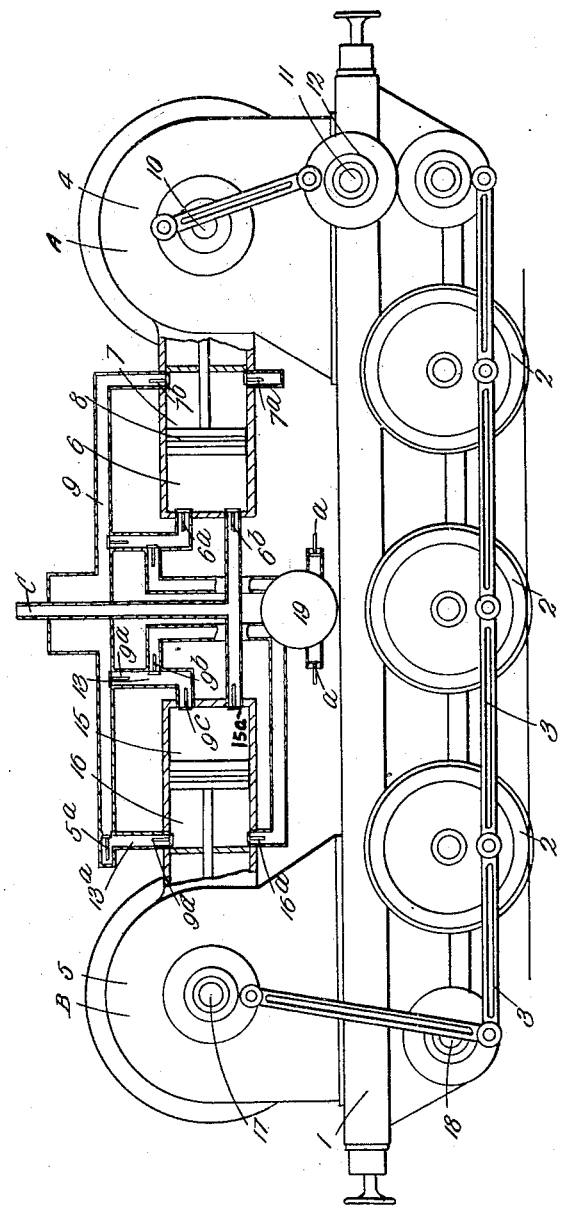

Patented Mar. 1, 1932

1,847,510

UNITED STATES PATENT OFFICE

JAN JUEL HAGEMEISTER AND ERIK JØRGEN-JENSEN, OF BIRMINGHAM, ENGLAND

INTERNAL COMBUSTION ENGINE LOCOMOTIVE

Application filed February 16, 1928, Serial No. 254,877, and in Great Britain October 11, 1927.

This invention relates to locomotives of the internal combustion engine type, particularly suitable for use on railways.

The object of the invention is to provide ways and means by which the driving power is transferred from the internal combustion engine driving unit or units to the driving wheels of the locomotive. A further object is to provide an arrangement whereby jars and shocks on starting-up the locomotive are reduced to a minimum or entirely eliminated. A still further object is to improve generally the lay-out or arrangement of the driving and other mechanisms whereby, amongst other things, the moving parts may counterbalance each other to prevent undue strain or weight on one particular part thereof.

The invention contemplates an extended use of compressed air or other compressible fluid for starting-up the locomotive, and the development of the use of such fluid as a power transmission means and for other incidental purposes in connection with the general running of such locomotives.

In accordance with the preferred form of the present invention we provide an internal combustion engine unit, an air or other gas compressor associated with said unit, and a further engine unit capable of being driven by the air or other gas compressed by said compressor and of being coupled to the driving wheels of the locomotive. The air or other gas compressed by said first mentioned unit is caused to serve as the power transmission means between the said unit and the driving wheels which are actuated by the second mentioned unit.

In carrying the invention into effect, we render both engine units capable of being coupled separately to driving wheels of the locomotive in order that both units may be used as separate driving units as soon as the locomotive reaches a suitable speed.

By the term engine unit as herein used is to be understood a unit having a single cylinder, or a unit having a plurality of cylinders, or a unit comprised by a plurality of interconnected multi-cylindered units.

The invention will now be described with reference to the drawing which is a diagram of a locomotive embodying the invention.

The locomotive consists of a bedplate or chassis frame 1 mounted on preferably ordinary locomotive axles with flanged driving wheels 2 which are connected by coupling rods 3 or cranks. On the bedplate 1 are placed two or more internal combustion engine units preferably of the Diesel type. In the diagram only two units 4 and 5 are shown. If desired the locomotive may be constructed with more engine units, but their working schemes will be preferably reduced to only two groups A and B, and for simplicity the following description deals with only two engine units A and B.

The A-engine unit is a multi-cylindered internal combustion engine of the cross-head type, shown partly in section in the drawing, and constructed in a way that permits the chamber 7 opposite the combustion chamber 6 to be used as an air compressor, i. e. the piston 8 works both in the combustion chamber 6 and in the compressor chamber 7 and acts also as an air compressing piston. The engine is thus directly associated with an air compressor, preferably in such manner, as shown, that the compressor forms an integral part of the engine. The combustion chamber 6, in addition to its usual fuel inlet valve, is provided with an air inlet valve indicated by 6a, and an exhaust valve indicated by 6b. The compressor chamber 7 is provided with an automatic suction air inlet valve 7a and a mechanically or otherwise operated discharge valve 7b. An air pressure pipe 9 communicates with the chamber 7 by way of the valve 7b. The crank-shaft 10 is connected by connecting rods or chains to an auxiliary crank-shaft 11 and further through a suitable clutch 12 by rods or chains to the driving wheels 2.

The B-engine unit 5, shown partly in section in the drawing, is an internal combustion engine of the same cross-head type as the A-unit. It is connected with the air pipe 9 by means of branch pipes 13, 13a having suitably controlled valve mechanism 9a, 9c, 9d, whereby the compressed air in the pipe 13, 13a may be supplied to the engine to work in both the combustion chamber 15 and in the opposite chamber 16. The combustion chamber 15 is provided with an exhaust valve 15a communicating with an exhaust manifold C, and the chamber 16 is provided with an exhaust valve 16a communicating with a storage tank 19. It will thus be seen that the piston of the engine 5 may be actuated by the air compressed by the engine 4, or by internal combustion, or by both, and that the engine 5 may act also as an air compressor as it is similar in construction to the engine 4. For this later purpose a valve 5a is provided which in one position opens the pipe 13a to the atmosphere. The crank-shaft 17 of the B-engine unit is connected through the auxiliary crank-shaft 18 by rods or chains to the driving wheels 2, this connection being permanent.

The valve mechanism is not represented fully in the drawing, as it will be understood that any construction of such mechanism may be employed, both automatically and time-gear governed, as may suit the purpose.

The operation of the locomotive is as follows:—

Before starting, the clutch 12 is released in order to permit the A-engine unit to work as an air compressor and independent of the driving wheels; then the A-engine unit is started by compressed air or by other means, sucking air into the chamber 7 through the valve 7a, and then compressing it and passing it through the valve 7b into the pipe 9. The valve 9a is opened by manual control, and the valves 9c and 9d are set to open and close automatically according to the position of the crank-shaft 17. The valve 9a may be kept permanently open during starting as valves 9c, 15a serve as inlet and exhaust controls respectively. When sufficient pressure prevails in the pipe 9 and on one side of the piston or pistons of the B-engine unit, this unit will rotate acting as an air engine unit, which rotation is transferred through the auxiliary shaft 18 to the driving wheels, and the locomotive is started. The start is effected without jars or jerks as the power transmission from the A-engine unit to the driving wheels is by compressible fluid the pressure of which increases until it is just sufficient to overcome the resistance to starting. The speed increases as the fluid pressure increases.

When the B-engine unit has attained a speed suitable to allow it to work as an internal combustion engine unit, the supply of compressed air to the pipe 13 is cut off by closing manually or otherwise the valve 9a, and fuel is supplied to the chamber 15 through a suitable valve, not shown, whereupon the B-engine unit will work both as an internal combustion engine unit (in chamber 15) and as an air-actuated engine unit (in chamber 16), power thus being supplied on both sides of the same piston.

When the speed of the B-engine unit is such that the A-engine unit cannot advantageously supply an amount of air thereto compressed sufficiently to operate the B-engine unit as a part air-actuated engine, the compressed air supply from the A-engine unit to the pipe 9 is cut off in any suitable manner. The speed of revolution of the A-engine unit is synchronized to that of the driving wheels and the clutch 12 is then put in to enable the A-engine unit to work through the auxiliary shaft 11 direct on to the driving wheels. Preferably means are provided associated with the clutch 12 for preventing the said clutch from being engaged except when the moving parts of both A and B-engine units are in such positions that they are respectively counterbalanced, the bedplate with the engine units forming a non-oscillating unit. This means may comprise a pin and slot connection associated with said clutch, which register with each other only when said moving parts are in counterbalancing positions and which permit engagement of said clutch only when said pin and slot are in registry. This mechanism per se forms no part of the present invention, and is therefore not shown in the drawing.

The compressed air having released a substantial part of its pressure in the B-engine unit is still under a low pressure when exhausted from the motor, and this exhaust air is accumulated in the tank 19 from which all air inlet pipes to both combustion engine units take their supply. By regulating the pressure in the tank 19, preferably by means of automatic valves a, it is possible to accumulate and store in the tank 19 a charge of air under proper pressure for supercharging the engine units, or supercharging can be effected by air supplied direct from the compressor or compressors so as to increase the engine efficiency.

During the run, when the A-engine unit is directly connected to the driving wheels, the compressor chambers 7 and the air chambers 16 may both serve to maintain the pressure in the tank 19, or the compressors of either or both engine units may supply compressed air for charging reserve tanks for rail sanding, for operating the whistle or air brakes or other auxiliary mechanism, and one of the compressor chambers may act for vacuum suction, if vacuum braking be employed.

Finally, the exhaust gases from the combustion engine units may be used in any convenient manner for heating the compressed air when the B-engine unit is acting as an air-actuated engine unit. To indicate this diagrammatically the exhaust manifold C is illustrated as extending through the pipe 9.

In the embodiment illustrated the constructional and other details have been omitted for the sake of simplicity. Likewise the invention is not to be construed as limited to the lay-out illustrated, as the drawing is purely diagrammatic. The valves can be controlled in any suitable manner, and valves other than those represented in the drawing may be provided as and where required. The A-engine unit may comprise one or more cylinders adapted solely for charging pressure flasks. The compressors may comprise units separate from the engines, but it is convenient to arrange them as described.

Further, either or both engine units may be so furnished as to be rendered operative by internal combustion on both sides of the pistons.

It is apparent that we could employ any other compressible fluid in place of air, although air is obviously the most convenient fluid to use.

With the detailed disclosure above given, it is thus obvious that modifications will suggest themselves, and it is not desired to limit the invention otherwise than is necessary in view of prior art.

What we claim and desire to secure by Letters Patent of the United States is:—

1. A locomotive comprising in combination a frame, wheels supporting said frame, coupling rods connecting all of said wheels together, an internal combustion engine unit on said frame, a fluid compressor associated with said unit, a second engine unit on said frame capable of being driven by fluid compressed by said compressor, clutch means adapted to connect the first said engine unit with the wheels, and means coupling the second said engine unit to the wheels.

2. A locomotive comprising in combination a frame, driving wheels supporting said frame, an internal combustion engine unit on said frame, a fluid compressor forming a part of said unit, clutch mechanism for coupling said unit to said driving wheels, a further internal combustion engine unit on said frame, means for coupling said further unit to the said driving wheels, and means permitting said further unit to function also as a fluid pressure engine unit driven by the fluid compressed by said compressor.

3. A locomotive comprising in combination a frame, driving wheels supporting said frame, an internal combustion engine unit on said frame, a fluid compressor forming an integral part of said unit, means for coupling said unit to the said driving wheels including clutch mechanism, a further internal combustion engine unit on said frame, means for permanently coupling said further unit to said driving wheels, and means permitting said further unit to function also as a fluid pressure engine unit driven by the fluid compressed by said compressor.

4. A locomotive comprising in combination a frame, driving wheels supporting said frame, an internal combustion engine unit on said frame having pistons arranged to serve also as air-compressing pistons, clutch mechanism for coupling said unit to said driving wheels, a further internal combustion engine unit on said frame, means for conveying air compressed by the air-compressing pistons of said first-mentioned unit to said further unit, means permitting actuation of said further unit by air compressed by said air-compressing pistons, and means for coupling said further unit to the said driving wheels.

5. A locomotive comprising in combination a frame, driving wheels supporting said frame, an internal combustion engine unit on said frame having pistons arranged to serve also as air-compressing pistons, clutch mechanism for coupling said unit to said driving wheels, a further internal combustion engine unit on said frame, means for conveying air compressed by the air-compressing pistons of said first-mentioned unit to said further unit, exhaust conduits arranged to cause a preheating of air compressed by said air-compressing pistons, means permitting actuation of said further unit by air compressed and preheated as aforesaid, and means for coupling said further unit to the said driving wheels.

6. A locomotive comprising in combination two internal combustion engine units each having pistons arranged to serve also as air-compressing pistons, means interconnecting said units whereby air compressed by one unit may be supplied directly therefrom to the other unit, valve mechanism whereby said other unit may be actuated by air compressed by said one unit, a storage tank and means for supplying air compressed by both said units to said storage tank.

7. A locomotive comprising in combination two internal combustion engine units each having pistons arranged to serve also as air-compressing pistons, means interconnecting said units whereby air compressed by one unit may be supplied directly therefrom to the other unit, valve mechanism whereby said other unit may be actuated by air compressed by said one unit, a storage tank, means for supplying air compressed by said units to said storage tank, and mean for supplying compressed air from said tank to said units for effecting supercharging thereof.

8. A locomotive comprising in combination two internal combustion engine units of the cross-head type, means for admitting air to said units to be compressed thereby, means for supplying air compressed by one of said units to the other of said units to effect a starting thereof, driving wheels and means for coupling separately said units to said driving wheels.

9. A locomotive comprising in combination two internal combustion engine units of the cross-head type having pistons arranged to serve also as air-compressing pistons, means for supplying air compressed in one unit to the other unit to effect a starting of said other unit, driving wheels, means permanently coupling said other unit to said driving wheels, and means including clutch mechanism for coupling said first-mentioned unit to said driving wheels.

10. A locomotive comprising in combination two internal combustion engine units of the cross-head type having pistons arranged to serve also as air-compressing pistons, a tank connected to said units for storing air compressed by said pistons, means for supplying compressed air from said tank to the combustion chambers of said units to effect supercharging thereof, means for supplying air compressed in one unit to the other unit to effect a starting of said other unit by compressed air, driving wheels, means permanently coupling said other unit to said driving wheels, and means including clutch mechanism for coupling said first-mentioned unit to said driving wheels.

11. A locomotive comprising in combination two internal combustion engine units of the cross-head type having pistons arranged to serve also as air-compressing pistons, a tank connected to said units for storing air compressed by said pistons, means for supplying compressed air from said tank to the combustion chambers of said units to effect supercharging thereof, means for supplying air compressed in one unit to the other unit to effect a starting of said other unit by compressed air, means permitting an exchange of heat between exhaust gases and compressed air supplied to said other unit, driving wheels, and means for coupling separately said units to said driving wheels.

12. A locomotive comprising in combination two internal combustion engine units of the cross-head type having pistons arranged to serve also as air-compressing pistons, a tank connected to said units for storing air compressed by said pistons, means for supplying compressed air from said tank to the combustion chambers of said units to effect supercharging thereof, means for supplying air compressed in one unit to the other unit to effect a starting of said other unit by compressed air, means permitting an exchange of heat between exhaust gases and compressed air supplied to said other unit, driving wheels, means permanently coupling said other unit to said driving wheels, and means including clutch mechanism for coupling said first-mentioned unit to said driving wheels.

JAN JUEL HAGEMEISTER.
ERIK JØRGEN-JENSEN.